Patented Feb. 5, 1924.

1,482,514

UNITED STATES PATENT OFFICE.

MAURICE GUÉRIN, OF PARIS, FRANCE.

PROCESS FOR THE COMMERCIAL PREPARATION OF AMINOPHENYLARSONIC ACIDS.

No Drawing.  Application filed September 6, 1922.  Serial No. 586,531.

*To all whom it may concern:*

Be it known that I, MAURICE GUÉRIN, a citizen of the Republic of France, and resident of Paris, in the Republic of France, have invented certain new and useful Improved Processes for the Commercial Preparation of Aminophenylarsonic Acids, of which the following is a specification.

Several methods of preparing aminophenylarsonic acids by reduction are already known: that, however, which depends on the reaction of ferrous salts involves numerous filtrations, and that by hydrosulphites depends upon secondary reactions which it is difficult to control.

This invention relates to a particularly simple process which is not subject to the aforesaid disadvantages and consists in the reduction of the nitro acids in alkaline solution by means of a reducing sugar.

For example, nitro.p.oxyphenylarsonic acid having the formula

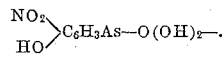

is dissolved with an excess of soda or potash and then reduced by a sugar such as glucose, molasses or any other reducing sugar. The mixture of the solution and sugar is preferably made at 50° C. Heat is evolved during the reduction, the temperature rising to about 100° C.

After cooling, the solution is made slightly acid by the addition of hydrochloric acid whereupon amino.p.phenylarsonic acid.

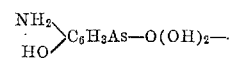

is precipitated. It may be purified and decolorized by filtering the hydrochloric acid solution through charcoal.

The position of the nitro group does not matter as the reaction takes place with o. m. and p. acids and also with their substitution products, and with any nitro acid, simple, nitro oxy, nitro amino, etc.

Having now particularly described and set forth the nature of my said invention, and in what manner the same is to be performed, I declare that what I claim is:

The process of manufacturing aminophenylarsonic acids and their substitution products by reducing a nitrophenylarsonic acid, or a substitution product thereof, in alkaline solution by means of a reducing sugar.

In witness whereof, I have hereunto signed my name this 1st day of August, 1922.

MAURICE GUÉRIN.